US009329561B2

(12) United States Patent
Hayasaki et al.

(10) Patent No.: US 9,329,561 B2
(45) Date of Patent: May 3, 2016

(54) LOW POWER CONSUMPTION ACCURATE POWER SUPPLY OVERVOLTAGE DETECTION

(71) Applicant: CANON KABUSHIKI KAISHA, Tokyo (JP)

(72) Inventors: Minoru Hayasaki, Mishima (JP);
Nozomu Nakajima, Kawasaki (JP);
Yasuhiro Nakata, Mishima (JP);
Hiroshi Mano, Numazu (JP); Takao Kawazu, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 258 days.

(21) Appl. No.: 14/188,508

(22) Filed: Feb. 24, 2014

(65) Prior Publication Data
US 2014/0254210 A1    Sep. 11, 2014

(30) Foreign Application Priority Data
Mar. 8, 2013   (JP) .................................. 2013-046745

(51) Int. Cl.
*H02M 1/32* (2007.01)
*H02H 7/10* (2006.01)
*G03G 15/00* (2006.01)
*H02H 7/122* (2006.01)
*H02M 3/335* (2006.01)

(52) U.S. Cl.
CPC ............ *G03G 15/80* (2013.01); *H02H 7/1222* (2013.01); *H02M 1/32* (2013.01); *H02M 3/33507* (2013.01); *G03G 2215/00983* (2013.01)

(58) Field of Classification Search
CPC .................................. H02H 7/10; H02M 1/32
USPC ........................................................ 363/56.11
See application file for complete search history.

(56) References Cited

U.S. PATENT DOCUMENTS 3,816,809 A *  6/1974  Kuster ................ H02M 3/3385
                                                                 361/18
5,818,670 A *  10/1998  Ahn ........................ H02H 7/122
                                                                 361/18

(Continued)

FOREIGN PATENT DOCUMENTS

JP        07184373 A       7/1995
JP       2000134794 A       5/2000
JP       2006-288155 A     10/2006

OTHER PUBLICATIONS

U.S. Appl. No. 14/148,478, filed Jan. 6, 2014 by Nakajima et al.

(Continued)

*Primary Examiner* — Jeffrey Sterrett
(74) *Attorney, Agent, or Firm* — Fitzpatrick, Cella, Harper & Scinto (57) ABSTRACT

The power supply apparatus includes a transformer having a primary and secondary sides, a first line and a second line to which an AC voltage is input from an AC power supply, a rectifying and smoothing unit that rectifies and smoothes the AC voltage, a shut-off unit provided between the first line and the rectifying and smoothing unit, a switching element that switches a current from the rectifying and smoothing unit to the primary side of the transformer, a first overvoltage detection unit that outputs a voltage corresponding to the AC voltage, a second overvoltage detection unit that outputs an overvoltage detection signal; and a control unit that controls the shut-off unit to shut off the input of the AC voltage.

20 Claims, 8 Drawing Sheets

(56) References Cited

U.S. PATENT DOCUMENTS

| | | | | |
|---|---|---|---|---|
| 5,986,902 | A * | 11/1999 | Brkovic | G05F 1/618 323/276 |
| 6,088,244 | A * | 7/2000 | Shioya | H02M 1/32 323/902 |
| 6,107,620 | A | 8/2000 | Shiba et al. | |
| 6,229,721 | B1 | 5/2001 | Mano et al. | |
| 6,862,193 | B2 | 3/2005 | Nakata | |
| 7,265,479 | B2 | 9/2007 | Yamaguchi et al. | |
| 7,425,789 | B2 | 9/2008 | Yasukawa et al. | |
| 8,242,873 | B2 | 8/2012 | Hayasaki et al. | |
| 8,503,197 | B2 | 8/2013 | Hayasaki et al. | |
| 2002/0130645 | A1 * | 9/2002 | Tsai | G05F 1/24 323/274 |
| 2006/0083031 | A1 * | 4/2006 | Cook, II | H02M 1/32 363/20 |
| 2009/0045788 | A1 * | 2/2009 | Williams | H02M 1/32 323/273 |
| 2010/0054790 | A1 * | 3/2010 | Inukai | G03G 15/5004 399/88 |
| 2013/0004196 | A1 | 1/2013 | Nagasaki et al. | |
| 2013/0027815 | A1 * | 1/2013 | Gaknoki | H02M 1/32 361/18 |
| 2013/0057875 | A1 * | 3/2013 | Hotogi | H02M 3/335 358/1.1 |
| 2013/0236206 | A1 | 9/2013 | Shoji et al. | |
| 2013/0307917 | A1 | 11/2013 | Hayasaki et al. | |
| 2014/0254210 | A1 * | 9/2014 | Hayasaki | G03G 15/80 363/21.12 |
| 2015/0016152 | A1 * | 1/2015 | Kojima | G03G 15/80 363/21.02 |
| 2015/0029618 | A1 * | 1/2015 | Collins | H02H 7/1252 361/18 |

OTHER PUBLICATIONS

U.S. Appl. No. 14/296,235, filed Jun. 4, 2014 by Minoru Hayasaki.

* cited by examiner

FIG. 3A  AC INPUT

FIG. 3B  ELECTROLYTIC CAPACITOR 108

FIG. 3C  CAPACITOR 204

FIG. 3D  REF TERMINAL OF SHUNT REGULATOR 211

FIG. 3E  GATE TERMINAL OF FET 110

FIG. 3F  MELTDOWN OF FUSE

LOW POWER CONSUMPTION ACCURATE POWER SUPPLY OVERVOLTAGE DETECTION

BACKGROUND OF THE INVENTION

1. Field of the Invention

The present invention relates to a power supply apparatus whose input source is a commercial AC power supply, and an image forming apparatus including the power supply apparatus.

2. Description of the Related Art

There are widely used power supply apparatus, which are to be mounted in various electronic equipment, and receive power from a commercial AC power supply so as to output necessary DC voltages to be used in the electronic equipment. For example, electronic equipment such as a copying machine and a printer usually uses a power supply apparatus whose input voltage is an alternating-current (AC) 100 V system (for example, AC 100 V to 120 V) for Japan and North America, or an AC 200 V system (for example, AC 220 V to 240 V) for Europe. However, the AC 100 V system and the AC 200 V type can share a power supply plug of the same shape depending on a country or a region, and hence both of a 100-V socket and a 200-V socket may exist in a mixed manner. In such a case, a user may erroneously input an overvoltage; for example, the user may erroneously input an A voltage of 200 V to a power supply apparatus of an AC 100 V system.

As a solution to the problem, an overvoltage protection unit for a power supply apparatus that receives a commercial AC voltage and outputs a DC voltage has been proposed. For example, a power supply apparatus that receives an AC voltage from a commercial AC power supply, and supplies a voltage to at least one load in parallel is proposed in Japanese Patent Application Laid-Open No. 2000-134794. Japanese Patent Application Laid-Open No. 2000-134794 describes an overvoltage protection circuit in which a fuse of a rated current that can reliably melt with the current-carrying capacity of a varistor is used as an overcurrent shut-off unit, which is connected in series to the varistor serving as an overvoltage restricting unit. When a rectifying and smoothing circuit in the power supply apparatus needs a large-capacity smoothing capacitor, an electrolytic capacitor is generally used. In the following, an electrolytic capacitor located at a subsequent stage of a rectification circuit that rectifies an AC voltage input from the commercial AC power supply is particularly referred to as "primary electrolytic capacitor." Japanese Patent Application Laid-Open No. H07-184373, for example, describes a technology of using a primary electrolytic capacitor in a power supply apparatus and addressing the service life of the primary electrolytic capacitor and management of the service life thereof. The power supply apparatus described in Japanese Patent Application Laid-Open No. H07-184373 is a switching power supply apparatus with a relatively large capacity, which is used in a system apparatus having both a control system and a drive system, such as a copying machine. A unit capable of prolonging the service life of the large primary electrolytic capacitor used in the rectifying and smoothing circuit and managing the service life of the primary electrolytic capacitor is proposed in Japanese Patent Application Laid-Open No. H07-184373. A power supply circuit that has an overvoltage protection circuit added to the related-art power supply circuit, and is configured to melt a fuse before the primary electrolytic capacitor opens when an overvoltage exceeding the input voltage range is applied, to thereby protect the power supply apparatus against the overvoltage is proposed in Japanese Patent Application Laid-Open No. 2006-288155.

The operation of opening an aluminum electrolytic capacitor which is used as the primary electrolytic capacitor is described. The aluminum electrolytic capacitor is configured to include an oxide coating film formed on the surface of a high-purity aluminum foil for an anode as a dielectric substance, an aluminum foil for a cathode, an electrolyte solution, and a separator (electrolytic sheet). When a voltage sufficiently exceeding a rated voltage is applied in the forward current direction of the aluminum electrolytic capacitor, a leak current increases rapidly, thereby generating heat. The heat generation decreases the withstanding voltage of the dielectric substance. When the dielectric substance dielectrically breaks down as a consequence, a large current flows drastically, and hence the internal pressure of the electrolytic capacitor rises in a short period of time. A pressure valve is provided to protect the electrolytic capacitor when the internal pressure of the electrolytic capacitor rises. When the pressure valve actuates (opens), the gasified electrolyte solution is discharged from the open pressure valve, and hence a further pressure is not applied to the electrolytic capacitor. The primary electrolytic capacitor used in the power supply circuit is often a component designed against an overvoltage. The component designed against an overvoltage is configured not to be short-circuited when a voltage equal to or higher than the withstanding voltage is applied and the pressure value actuates. That is, the pressure valve actuates safely. When the pressure valve opens, however, the discharged gasified electrolyte solution gives a distinctive smell. In this respect, an electrolytic capacitor with a high withstanding voltage or a component designed against an overvoltage is used, and an overvoltage protection circuit is further used to prevent the valve of the electrolytic capacitor from opening.

When a smaller and a lower-cost primary electrolytic capacitor is used in a power supply apparatus to cope with cost reduction and downsizing of the power supply apparatus, the withstanding margin of the primary electrolytic capacitor may become insufficient. In such a case, it is necessary to carry out more accurate detection of an overvoltage to prevent the valve of the primary electrolytic capacitor from opening. Further, to meet the specifications associated with the current power saving attempts, the circuit that detects an overvoltage needs to operate with low power consumption. When an overvoltage is detected accurately, however, the detection current generally needs to be large to a certain degree. This makes it difficult to detect an overvoltage with low power consumption.

SUMMARY OF THE INVENTION

The present invention has been made in view of the above-mentioned circumstances to enable accurate detection of an overvoltage with low power consumption.

A power supply apparatus according to one embodiment of the present invention is configured as follows.

The power supply apparatus includes a transformer having a primary side and a secondary side insulated with each other, a first line and a second line to which an AC voltage is input from an AC power supply, a rectifying and smoothing unit that rectifies and smoothes the AC voltage input through the first line and the second line, a shut-off unit provided between the first line and the rectifying and smoothing unit to shut off an input of the AC voltage, a switching element that switches a current from the rectifying and smoothing unit to the primary side of the transformer, a first overvoltage detection unit that when an input of an AC voltage higher than a first threshold value from the AC power supply is detected, outputs a voltage corresponding to the AC voltage, a second overvoltage detection unit that receives the voltage output from the first overvoltage detection unit, wherein when it is detected that the voltage is higher than a second threshold value, the second overvoltage detection unit outputs an overvoltage detection signal, and a control unit that controls the shut-off unit to shut off the input of the AC voltage when the overvoltage detection signal is detected.

Further features of the present invention will become apparent from the following description of exemplary embodiments with reference to the attached drawings.

DESCRIPTION OF THE EMBODIMENTS

Embodiments of the present invention are described hereinafter with reference to the accompanying drawings.

Outline of Related-art Power Supply Apparatus (Circuit Configuration of Power Supply Apparatus)

Figure 1:
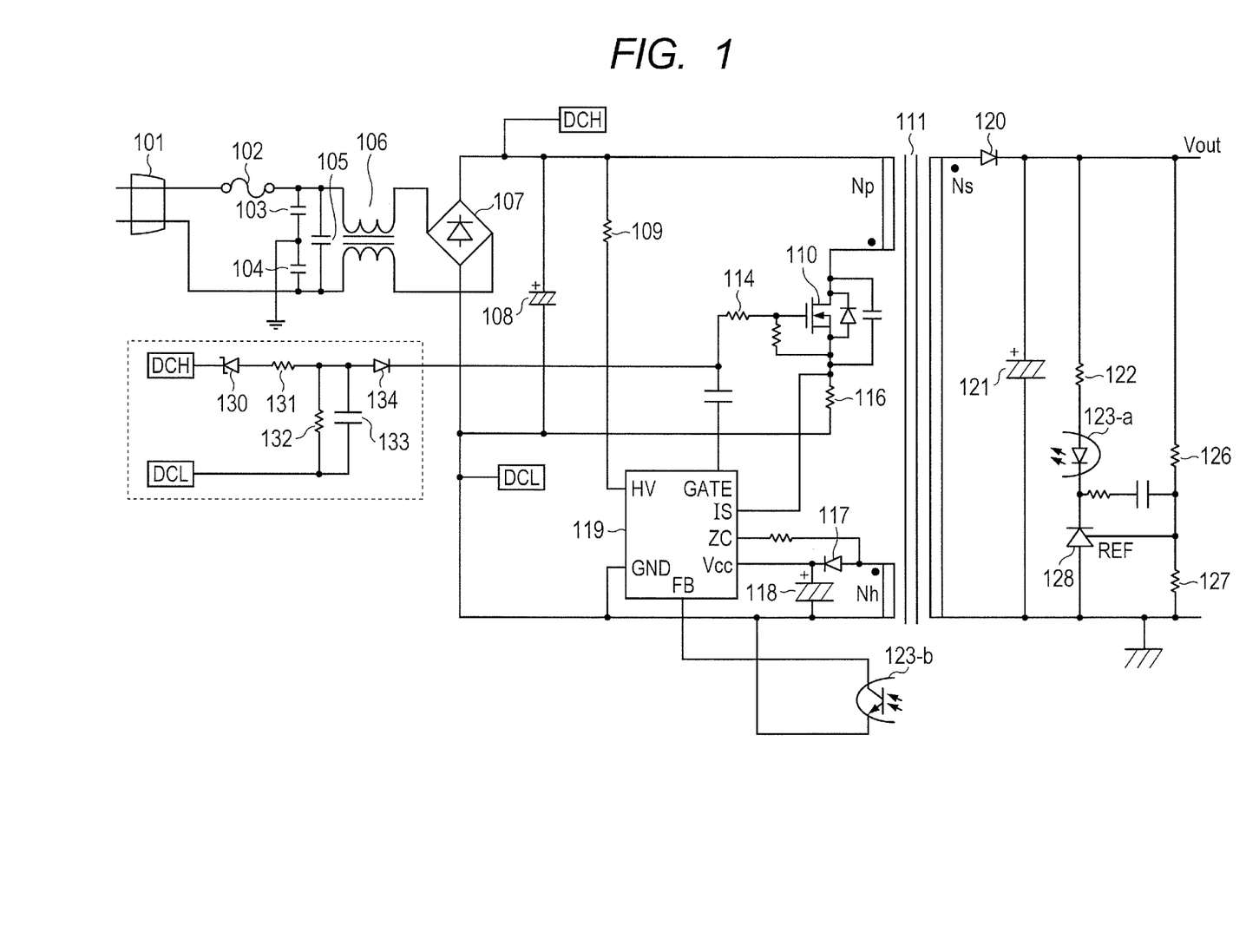
FIG. 1 is a diagram illustrating the circuit configuration of a related-art power supply apparatus, which is compared with embodiments of the present invention.

First, the circuit configuration and the operation of a power supply apparatus including a related-art typical overvoltage protection unit are described referring to FIG. 1 for comparison with the embodiments described below. FIG. 1 illustrates the configuration of the circuit of the related-art power supply apparatus. FIG. 1 illustrates a circuit of a flyback switching power supply with a broken-line block part representing an overvoltage protection circuit. In FIG. 1, an AC voltage input from an AC power supply (not shown) is full-wave rectified by a bridge diode 107 via an AC inlet 101, a fuse 102, and a common mode coil 106, and is then smoothed by a primary electrolytic capacitor 108. The input AC voltage is charged into the primary electrolytic capacitor 108 as substantially a constant DC voltage. Of the potential of the DC voltage smoothed by the primary electrolytic capacitor 108, a high-side potential is represented by DCH, and a low-side potential is represented by DCL. A voltage is supplied to an activation terminal HV via an activation resistor 109 to activate a power supply IC 119. The power supply IC 119 is an IC that controls the on/off state of an N channel field effect transistor 110 (hereinafter referred to as "FET 110") that performs a switching operation. Capacitors 103 and 104 are Y capacitors (line bypass capacitors), and a capacitor 105 is an X capacitor (across-the-line capacitor). The fuse 102 serving as an overcurrent shut-off unit is used to shut off power supply from the AC power supply (not shown) when a current supplied via the AC inlet 101 exceeds a predetermined current value.

A transformer 111 is configured to have a primary winding Np and a secondary winding Ns wound therearound, and additionally have an auxiliary winding Nh wound therearound. The secondary winding Ns has its winding direction opposite to the winding direction of the primary winding Np (in what is called flyback coupling). The auxiliary winding Nh has its winding direction opposite to the winding direction of the primary winding Np (in what is called flyback coupling).

The power supply IC 119 has terminals Vcc, GND, GATE, HV, IS, FB and ZC. A power supply voltage Vcc for driving the power supply IC 119, which is obtained by rectifying and smoothing a voltage induced on the auxiliary winding Nh by a diode 117 and an electrolytic capacitor 118, is input to the terminal Vcc which is a power-supply input terminal. A ground (GND) potential is input to the GND terminal. The GATE terminal is connected to the gate terminal of the FET 110 via a capacitor and a resistor 114. A high-level/low-level output from the GND terminal controls the on/off state of the FET 110. The HV terminal is a high-voltage terminal. When an input voltage to the Vcc terminal of the power supply IC 119 is low as in the case of activating the power supply apparatus, a necessary voltage is supplied from an activation circuit inside the power supply IC 119 based on the voltage input to the HV terminal so that the power supply IC 119 starts the operation at the time of activation. A timing at which the power supply IC 119 turns the FET 110 off from the on state is determined based on the input voltage to the IS terminal or the input voltage to the FB terminal.

A voltage induced on the secondary winding Ns of the transformer 111 is rectified and smoothed by a secondary rectification diode 120 and a secondary electrolytic capacitor 121, and output as a DC output voltage Vout. A shunt regulator 128 becomes conductive or non-conductive based on the output voltage Vout. A voltage obtained by dividing the output voltage Vout of the transformer 111 by a resistor 126 and a resistor 127 is input to a reference (REF) terminal of the shunt regulator 128. When the input voltage to the REF terminal is higher than a predetermined voltage, the shunt regulator 128 becomes conductive. When the input voltage to the REF terminal is lower than the predetermined voltage, on the other hand, the shunt regulator 128 becomes non-conductive. When the shunt regulator 128 becomes conductive, a current flows via a resistor 122 through an LED 123-a of a photocoupler provided on the secondary side of the transformer 111 so that the LED 123-a emits light. The on/off state of a phototransistor 123-b of the photocoupler on the primary side of the transformer 111 is controlled depending on whether the LED 123-a of the photocoupler is emitting light. One terminal of the phototransistor 123-b of the photocoupler is connected to the FB terminal of the power supply IC 119 so that a voltage proportional to the output voltage Vout of the transformer 111 is input to the FB terminal.

A current flowing in the primary winding Np of the transformer 111 permits a voltage produced across a current detection resistor 116 to be input to the IS terminal of the power supply IC 119. The power supply IC 119 determines the upper limit value of the input voltage to the IS terminal to be a voltage value proportional to the input voltage to the FB terminal. The voltage induced on the auxiliary winding Nh is input to the ZC terminal of the power supply IC 119. The power supply IC 119 detects the completion of the regeneration of the transformer 111 from the voltage input to the ZC terminal, and determines a timing at which the FET 110 is turned on from the off state.

The overvoltage protection circuit includes a constant voltage element 130, resistors 131 and 132, a capacitor 133, and a diode 134. The overvoltage protection circuit detects a voltage between the DCH which is the same potential as the potential of the positive terminal of the primary electrolytic capacitor 108 and the DCL which is the same potential as the potential of the negative terminal of the primary electrolytic capacitor 108. In the overvoltage protection circuit, when the potential difference between the DCH and DCL exceeds a predetermined value, the constant voltage element 130 becomes conductive, causing a voltage to be applied to the gate terminal of the FET 110 via the diode 134 and the resistor 114 so that the FET 110 becomes conductive.

(Operation of Power Supply Apparatus)

In FIG. 1, the AC voltage input from the AC inlet 101 is full-wave rectified by the bridge diode 107, and is charged in the primary electrolytic capacitor 108. Further, the power supply IC 119 is activated by the current that is supplied via the activation resistor 109, and the FET 110 is turned on by the power supply IC 119, causing a current to flow through the transformer 111. When the FET 110 is turned off, a DC voltage produced by the auxiliary winding Nh of the transformer 111, the diode 117, and the electrolytic capacitor 118 is supplied as the power supply voltage Vcc of the power supply IC 119, and hence the power supply IC 119 can maintain a stable operation. Further, the voltage induced on the secondary side of the transformer 111 is rectified and smoothed by the secondary rectification diode 120 and the secondary electrolytic capacitor 121, and hence the stable DC voltage Vout is output. The shunt regulator 128 and the photocoupler 123-a generate a feedback signal based on the output voltage Vout. The feedback signal is fed back to the power supply IC 119 via the photocoupler 123-b. Then, the power supply IC 119 changes the duty ratio and switching frequency of the FET 110 to control the output voltage Vout.

(Operation of Overvoltage Protection Circuit)

The operation of the related-art power supply apparatus illustrated in FIG. 1 when an overvoltage is input as an AC voltage input from an AC power supply is described. For example, the case is assumed where the withstanding voltage of the primary electrolytic capacitor 108 is a DC voltage of 250 V. When an input AC voltage of 240 Vac (rms) is applied to the primary electrolytic capacitor 108 via the AC inlet 101, a DC voltage of 339 V, which is a maximum root mean square value of 240 V, is charged into the primary electrolytic capacitor 108. When an overvoltage exceeding the withstanding voltage is applied to the primary electrolytic capacitor 108, the constant voltage element 130 becomes conductive, causing a breakdown current to flow. Then, the capacitor 133 is charged gradually, and the charged voltage tends to rise up to a voltage divided by the resistors 131 and 132. As a result, a forward current flows through the diode 134, raising the voltage to be applied to the gate terminal of the FET 110, and hence the FET 110 keeps the on state. Then, a large current flows through the FET 110, and hence the internal element of the fuse 102 serving as an overcurrent shut-off unit melts to shut off the circuit. Because the time period from the application of the overvoltage to the melting of the fuse is short, the fuse 102 can be melted safely without opening the valve of the primary electrolytic capacitor 108.

First Embodiment

In a first embodiment of the present invention, a power supply apparatus is described, which is obtained by providing, to the related-art typical power supply apparatus described above, an overvoltage protection circuit including a first overvoltage detection circuit that has a wide voltage detection range while having low power consumption and a second overvoltage detection circuit that has a narrow voltage detection range and high detection accuracy while having high consumption power. When detecting an overvoltage, the first overvoltage detection circuit starts supplying power to the second overvoltage detection circuit. There is provided a circuit configuration in which the second overvoltage detection circuit having high accuracy of detecting a voltage enhances the accuracy of detecting an overvoltage, and the second overvoltage detection circuit is inhibited from operating on the normal input voltage, thereby ensuring an overvoltage protecting operation on low power.

Circuit Configuration of Power Supply Apparatus

Figure 2:
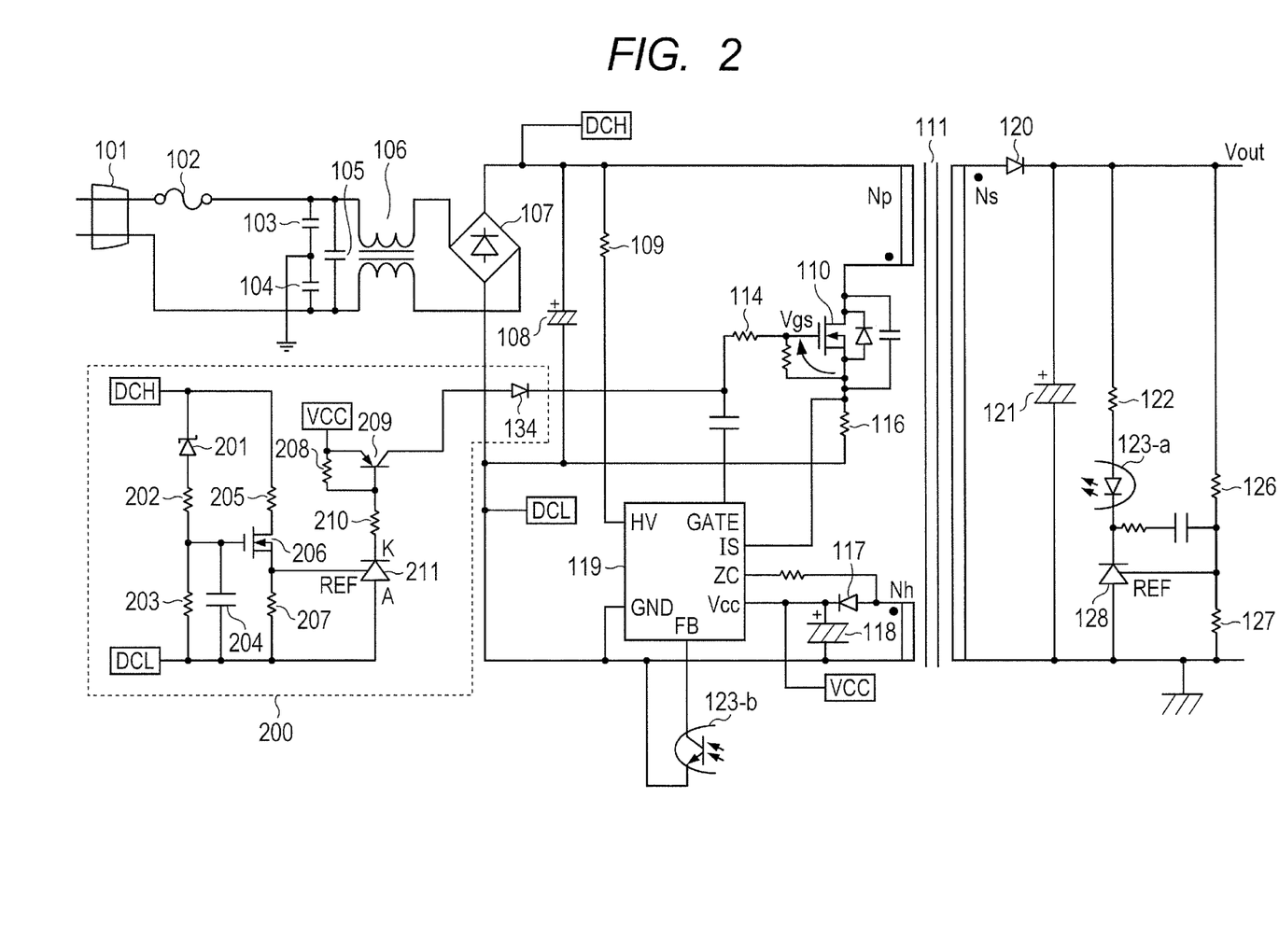
FIG. 2 is a diagram illustrating the circuit configuration of a power supply apparatus according to a first embodiment of the present invention.

FIG. 2 is a circuit diagram illustrating the circuit configuration of the power supply apparatus according to this embodiment. In FIG. 2, a broken-line block part represents an overvoltage protection circuit 200. DCH and DCL in FIG. 2 respectively show positive (high potential side) and negative (low potential side) nodes of the primary electrolytic capacitor 108, and are connected to the DCH and DCL of the overvoltage protection circuit 200, respectively. The overvoltage protection circuit 200 includes a first overvoltage detection circuit and a second overvoltage detection circuit. The first overvoltage detection circuit includes a Zener diode 201 connected to the DCH, resistors 202, 203, 205, and 207, a capacitor 204, and a field effect transistor 206 (hereinafter referred to as "FET 206"). The second overvoltage detection circuit includes a shunt regulator 211, a PNP transistor 209, resistors 208 and 210, and a diode 134. The resistors 202 and 203 connected to the Zener diode 201, and the capacitor 204 form a time-constant filter circuit. The gate terminal of the FET 206 is connected to the time-constant filter circuit. A voltage divided by the resistors 205 and 207 is input to the REF terminal of the shunt regulator 211 when the FET 206 is on. When the voltage input to the REF terminal is equal to or higher than an internal reference voltage, the shunt regulator 211 becomes on and conductive to permit a current to flow toward the anode (A) from the cathode (K). When the shunt regulator 211 becomes conductive, the transistor 209 is also turned on, permitting the voltage Vcc to be applied to the diode 134 via the transistor 209. The output terminal of the diode 134 is connected to the gate terminal of the FET 110 via the resistor 114. The other circuits illustrated in FIG. 2 are the same as the circuits illustrated in FIG. 1 described above, and hence descriptions thereof are omitted.

Operational Outline of Overvoltage Detection Circuit

Next, the operation of the overvoltage protection circuit 200 in the power supply apparatus illustrated in FIG. 2 is described based on the AC voltage from an AC power supply (not shown), which is input via the AC inlet 101. Note that, the circuit elements used in the overvoltage protection circuit 200 or the like meet the following specifications as one example. The primary electrolytic capacitor 108 is a component that copes with an abnormal voltage, and has a withstanding voltage of DC 200 V. The component that copes with an abnormal voltage in this case does not open its valve within 30 seconds when a voltage of DC 350 V, for example, is applied. The Zener voltage of the Zener diode 201 is DC 200 V. Two Zener diodes with a Zener voltage of 100 V may be connected in series. The internal reference voltage of the shunt regulator 211 is 2.495 V. The rated voltage of the power supply apparatus illustrated in FIG. 2 falls within a range of an AC voltage of 100 Vac (rms) to 127 Vac (rms), and the root mean square value of the AC voltage ranges from 100 V to 127 V. The maximum value of the DC voltage corresponding to the AC voltage in this case is DC 140 V to 179 V.

The input voltage from the AC power supply (not shown) is described on the following three cases. Case 1 covers the input voltage on which the first overvoltage detection circuit does not operate, Case 2 covers the input voltage on which the first overvoltage detection circuit operates but the second overvoltage detection circuit does not operate, and Case 3 covers the input voltage on which both of the first overvoltage detection circuit and second overvoltage detection circuit operate.

(1) Case 1: the input voltage on which the first overvoltage detection circuit does not operate The input voltage from the AC power supply (not shown) is, for example, an AC voltage of 140 Vac (rms) (the root mean square value of the AC voltage is 140 V) (the maximum value of the DC voltage is DC 198 V in this case). When the AC input voltage is 140 Vac (rms), the DC voltage charged in the primary electrolytic capacitor 108 becomes 198 V. Accordingly, only a voltage equal to or lower than the Zener voltage which is a first threshold value is applied to the Zener diode 201, and hence the current hardly flows through the Zener diode 201. Therefore, the voltage divided by the resistors 202 and 203 does not reach the threshold voltage of the gate terminal that turns on the FET 206. Because the FET 206 is off, the current does not flow through the resistor 207, and hence the input voltage at the REF terminal of the shunt regulator 211 is low. Therefore, the shunt regulator 211 stays off (non-conductive). As a result, the cathode terminal (K) of the shunt regulator 211 becomes open, and hence the current does not flow through the cathode terminal (K) of the shunt regulator 211. Because the current does not flow through the shunt regulator 211, the resistor 208 does not cause a voltage drop, and the base-emitter voltage of the transistor 209 is almost 0 V so that the transistor 209 stays off. As a result, the second overvoltage detection circuit does not operate either. The power consumption at this time is merely originated from a slight current flowing through the Zener diode 201, and the power consumed in the overvoltage protection circuit 200 is 1 mW or less.

(2) Case 2: the input voltage on which the first overvoltage detection circuit operates, but the second overvoltage detection circuit does not operate The input voltage from the AC power supply (not shown) is, for example, an AC voltage of 145 Vac (rms) (the root mean square value of the AC voltage is 145 V) (the maximum value of the DC voltage is DC 205 V in this case). When the AC input voltage is 145 Vac (rms), the DC voltage charged in the primary electrolytic capacitor 108 becomes 205 V. When the DC voltage of the primary electrolytic capacitor 108 becomes 205 V, which is higher than the Zener voltage of 200 V, the current starts flowing through the Zener diode 201. As a result, the Zener diode 201 becomes conductive, and hence a differential voltage of 5 V (=205 V-200 V) above the Zener voltage of 200 V is applied to the resistors 202 and 203, and a voltage divided by the resistors 202 and 203 is applied to the gate terminal of the FET 206. When the voltage applied to the gate terminal of the FET 206 exceeds the threshold value, the FET 206 is turned on, causing the current to flow through the resistors 205 and 207. The current flowing through the resistor 207 generates a voltage across the resistor 207. Accordingly, the gate-source terminal voltage of the FET 206 drops. Because the voltage produced across the resistor 207 is small, however, the FET 206 keeps the on state.

At this time, the voltage detecting accuracy of the shunt regulator 211 is determined by the voltage accuracy of the internal reference voltage of the shunt regulator 211 and the accuracy of the allowance for the resistances of the resistors 205 and 207 that divide the voltage, and the voltage can be detected with a high accuracy of ±2%. In consideration of the influence of the input current to the REF terminal of the shunt regulator 211 on the voltage detecting accuracy of the shunt regulator 211, however, the current flowing through the resistors 205 and 207 needs to be set to about 100 times the bias current of the shunt regulator 211. Therefore, the resistances of the resistors 205 and 207 cannot be set too large. Accordingly, this embodiment is configured so that a current of about 120 µA flows when the input voltage from the AC power supply is, for example, AC 225 V. The consumed power in the overvoltage protection circuit 200 at this time becomes about 27 mW.

The voltage divided by the resistors 205 and 207 is applied to the REF terminal of the shunt regulator 211. The shunt regulator 211 compares the internal reference voltage with the input voltage at the REF terminal. When the input voltage at the REF terminal is higher than the internal reference voltage, the shunt regulator 211 becomes conductive (on), and a current flows between the cathode terminal (K) and anode terminal (A) of the shunt regulator 211. In Case 2, it is assumed that voltage divided by the resistors 205 and 207 is lower than the internal reference voltage of the shunt regulator 211. In this case, therefore, the shunt regulator 211 becomes non-conductive (off), and an open state is established between the cathode terminal (K) and anode terminal (A) of the shunt regulator 211. As a result, the transistor 209 is not turned on, and the second overvoltage detection circuit does not operate.

(3) Case 3: the input voltage on which both of the first overvoltage detection circuit and the second overvoltage detection circuit operate The input voltage from the AC power supply (not shown) is, for example, an AC voltage of 230 Vac (rms) (the root mean square value of the AC voltage is 230 V) (the maximum value of the DC voltage is DC 325 V in this case). When an AC voltage of 230 Vac (rms) exceeding the rated voltage range of the power supply apparatus is input to the power supply apparatus via the AC inlet 101, the primary electrolytic capacitor 108 starts being charged to DC 325 V. At this time, the voltage applied to the Zener diode 201 exceeds the Zener voltage of DC 200 V, and hence the Zener diode 201 becomes conductive and the current flows therethrough. Consequently, the Zener diode 201 tries to set the voltage across the Zener diode 201 to a constant voltage of DC 200 V. The current that flows at this time produces voltages across the resistor 202 and the resistor 203 to balance the voltages. Therefore, the voltage across the capacitor 204 and the resistor 203 has a voltage value obtained by dividing a DC voltage of 125 V, which is obtained by subtracting the Zener voltage of DC 200 V from DC 325 V applied to the Zener diode 201, by the resistors 202 and 203.

Because a voltage higher than the threshold value that turns the FET 206 on is applied between the gate and source terminals of the FET 206, the FET 206 is turned on so that the voltage divided by the resistors 205 and 207 is input to the REF terminal of the shunt regulator 211. Because the voltage input to the REF terminal of the shunt regulator 211 is higher than the second threshold value, that is, the internal reference voltage of the shunt regulator 211 of 2.495 V at this time, the shunt regulator 211 becomes conductive. Therefore, the voltage at the cathode terminal (K) of the shunt regulator 211 drops to nearly 2.495 V, causing the current to flow through the transistor 209 and turning on the transistor 209. As a result, the voltage Vcc is applied to the gate terminal of the FET 110 via the transistor 209, the diode 134, and the resistor 114, forcibly turning on the FET 110. Then, a current corresponding to the overvoltage from the AC power supply (not shown) that is input via the AC inlet 101 flows through the fuse 102, and hence the fuse 102 melts to be open, thereby shutting off the circuit.

Operational Waveforms of Power Supply Apparatus

Figure 3A:
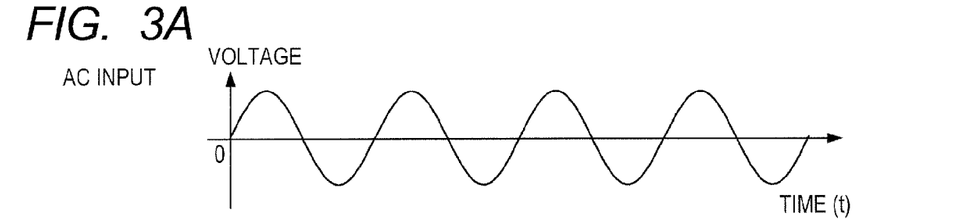
FIGS. 3A, 3B, 3C, 3D, 3E and 3F are diagrams illustrating operational waveforms in circuit elements of the power supply apparatus according to the first embodiment.
Figure 3B:
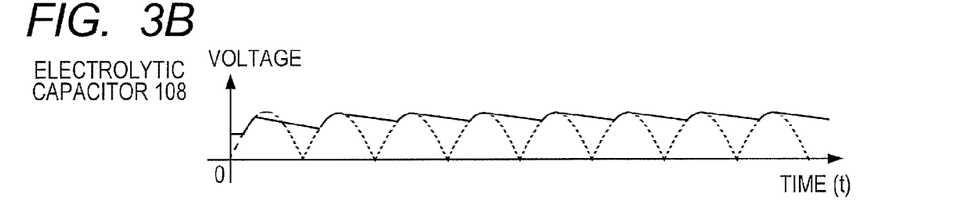
Figure 3C:
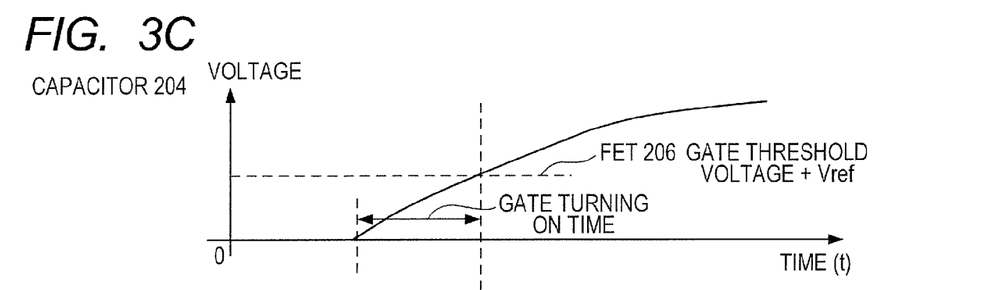
Figure 3D:
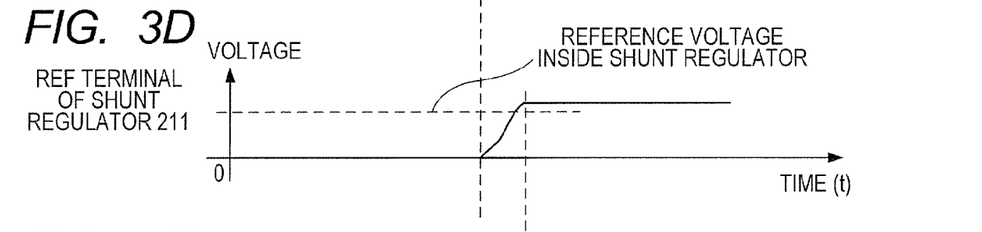
Figure 3E:
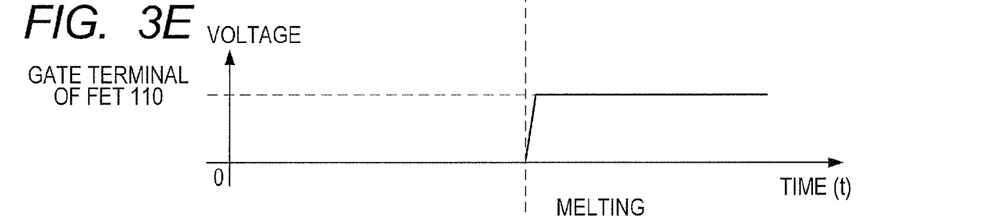
Figure 3F:
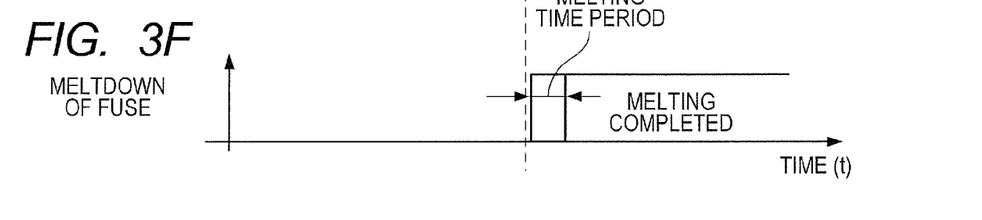

FIGS. 3A, 3B, 3C, 3D, 3E and 3F are diagrams illustrating operational waveforms in circuit elements of the power supply apparatus in the above-mentioned Case 3. In FIGS. 3A to 3F, the abscissa represents time t. FIG. 3A illustrates the waveform (sinusoidal waveform) of the AC voltage to be input via the AC inlet 101, FIG. 3B illustrates the waveform of the DC voltage to be charged in the primary electrolytic capacitor 108, and FIG. 3C illustrates the waveform of the voltage to be charged in the capacitor 204 of the overvoltage protection circuit 200. Further, FIG. 3D illustrates the waveform of the voltage to be input to the REF terminal of the shunt regulator 211, FIG. 3E illustrates the waveform of the voltage to be input to the gate terminal of the FET 110, and FIG. 3F illustrates the waveform that represents the timing at which the fuse 102 melts.

When the AC voltage with a sinusoidal waveform illustrated in FIG. 3A is input via the AC inlet 101 from the AC power supply (not shown), the pulsating output (broken line in FIG. 3B) full-wave rectified by the bridge diode 107 is applied to the primary electrolytic capacitor 108. The input AC voltage is charged into the primary electrolytic capacitor 108, and hence the waveform of the voltage in the primary electrolytic capacitor 108 becomes what is shown by a solid line in FIG. 3B. The voltage charged in the primary electrolytic capacitor 108 is input to the overvoltage protection circuit 200.

FIG. 3C illustrates how the voltage charged in the primary electrolytic capacitor 108 is charged in the capacitor 204, and is applied to the gate terminal of the FET 206 so that the FET 206 is turned on. In FIG. 3C, a waveform indicated by a solid line shows the waveform of the voltage in the capacitor 204. When the voltage charged in the primary electrolytic capacitor 108 is lower than the Zener voltage of the Zener diode 201, the Zener diode 201 does not become conductive, and hence a voltage is not charged in the capacitor 204. When the voltage charged in the primary electrolytic capacitor 108 becomes higher than the Zener voltage of the Zener diode 201, however, the Zener diode 201 becomes conductive, charging the capacitor 204 so that the voltage in the capacitor 204 illustrated in FIG. 3C rises. Then, the voltage of the capacitor 204 is applied to the gate terminal of the FET 206. When the applied voltage exceeds a predetermined value, the FET 206 is turned on. The voltage with the predetermined value in this case is determined by the gate threshold voltage between the gate terminal and the source terminal of the FET 206 and a voltage Vref that is produced across the resistor 207 and is to be input to the REF terminal of the shunt regulator 211. The time period from the application of the voltage to the gate terminal of the FET 206 from the capacitor 204 until the transition of the state of the FET 206 to the on state is called "gate turning on time." The gate turning on time is determined by the time constant of the resistor 202 and the capacitor 204, and may be set to several seconds to prevent a malfunction originating from an instantaneous voltage variation.

When the FET 206 is turned on, the voltage produced across the resistor 207 by the drain current of the FET 206 is input to the REF terminal of the shunt regulator 211 as illustrated in FIG. 3D. The overvoltage input via the AC inlet 101 causes the charged voltage in the capacitor 204 to rise. Accordingly, the drain current of the FET 206 rises, and hence the voltage across the resistor 207 that is input to the REF terminal of the shunt regulator 211 rises. When the input voltage to the REF terminal becomes higher than the internal reference voltage of the shunt regulator 211, the shunt regulator 211 becomes conductive, and hence the current flows through the anode terminal (A) from the cathode terminal (K). As a result, the transistor 209 is turned on, and the voltage Vcc is applied to the gate terminal of the FET 110 via the transistor 209, the diode 134, and the resistor 144 as illustrated in FIG. 3E. When the gate voltage Vgs to be applied to the gate terminal of the FET 110 rises, the value of the current flowing through the FET 110 increases. As a result, when a current exceeding a predetermined current value flows over the melting time period of the fuse 102 as illustrated in FIG. 3F, the fuse 102 melts to be open (melting complete), thus shutting off power supply via the AC inlet 101. The melting time period of the fuse 102 varies depending on the fuse in use and the environment under which the fuse is used, e.g., line impedance.

Variation in Detected Voltage in Overvoltage Protection Circuit

When the applied voltage is equal to or lower than the Zener voltage, the current hardly flows through the Zener diode 201 of the first overvoltage detection circuit. When the power supply apparatus is used within the range of the rated voltage, therefore, a voltage in non-conductive state is applied to the Zener diode 201, and hence power consumption hardly occurs, ensuring a power-saved operation. Further, the voltage at which the shunt regulator 211 of the second overvoltage detection circuit becomes conductive in accordance with the voltage input to the REF terminal of the shunt regulator 211 depends on the resistances of the resistors 205 and 207, the accuracy of the allowance for the resistances, and the voltage accuracy of the internal reference voltage of the shunt regulator 211. Even when an ordinary component, e.g., a shunt regulator with the voltage accuracy of ±0.75% of the internal reference voltage or a resistor with the accuracy of ±1% of the allowance of the resistance is used, the variation range of the voltage where the shunt regulator becomes conductive is as follows. Specifically, the voltage variation has a narrow range from a voltage 2 (e.g., DC 221 V) (FIG. 4) which is the lower limit of the detection variation of the second overvoltage detection circuit to a voltage 4 (e.g., DC 228 V) (FIG. 4) which is the upper limit of the detection variation of the second overvoltage detection circuit, and the voltage accuracy is high. Even in consideration of the operational voltage variation of an element, the protection operation can be performed on a voltage lower than a voltage 5 (FIG. 4) which is a target protection voltage.

Figure 4:
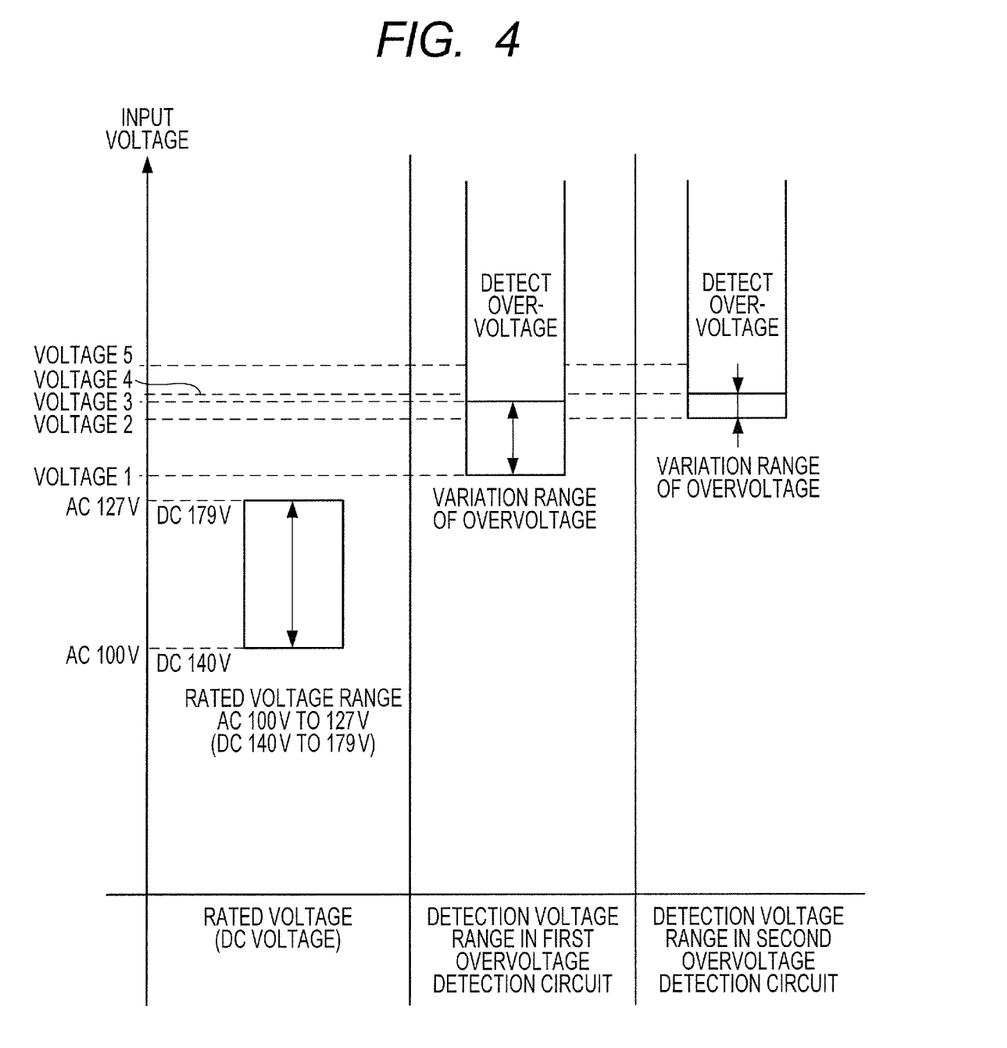
FIG. 4 is a diagram illustrating the relation between threshold values of a first overvoltage detection circuit and a second overvoltage detection circuit and variation ranges of detection of an overvoltage in the respective overvoltage detection circuits.

FIG. 4 is a diagram illustrating the relation between the variation ranges for detected voltages in the first overvoltage detection circuit and the second overvoltage detection circuit and the rated voltage of the power supply apparatus. In FIG. 4, the ordinate represents the input voltage, and the abscissa represents the rated voltage (DC voltage) indicating the DC voltage corresponding to the input AC voltage, the detection voltage range in the first overvoltage detection circuit, and the detection voltage range in the second overvoltage detection circuit.

The rated voltage range of the power supply apparatus according to this embodiment is from AC 100 V to AC 127 V, and is DC 140 V to 179 V in terms of DC voltage. If a Zener diode 201 with a Zener voltage of DC 200 V at which the first overvoltage detection circuit including the Zener diode 201 starts operating, for example, is selected, the operation start voltage varies as follows. That is, as illustrated in FIG. 4, the operation start voltage has a large variation due to a variation in components in use. For example, the operation start voltage for a component that operates on a low voltage is a voltage 1 (e.g., DC 188 V), and the operation start voltage for a component that operates on a high voltage is a voltage 3 (e.g., about DC 225V). Specifically, depending on a variation in the Zener voltage of the Zener diode 201, the first overvoltage detection circuit may operate on the voltage 1 or may not operate until the voltage 3. As described above, on the other hand, the shunt regulator 211 of the second overvoltage detection circuit operates when the input voltage comes in a range from the voltage 2 (e.g., DC 221 V) to the voltage 4 (e.g., DC 228 V). Accordingly, the upper limit value (voltage 4) of the voltage at which the second overvoltage detection circuit operates is set higher than the upper limit value (voltage 3) of the voltage at which the first overvoltage detection circuit operates, and the lower limit value (voltage 1) of the operational voltage of the first overvoltage detection circuit is set higher than the upper limit voltage of the rated voltage of the power supply apparatus. This embodiment is configured in such a way that, even when any components with whatever voltage variations are disposed in the Zener diode 201 of the first overvoltage detection circuit and the shunt regulator 211 of the second overvoltage detection circuit, the first overvoltage detection circuit does not operate in a normal mode. As a result, the power supply apparatus according to this embodiment can operate with low power consumption when the input voltage falls within the range of the rated voltage. Further, a variation in protection operation when an overvoltage is applied, i.e., a variation in the voltage that shuts off the circuit of the power supply apparatus can be managed as a variation in the voltage in the second overvoltage detection circuit. Note that, the voltages presented herein are just illustrative to give an example of the relation between the operational voltage range of the first overvoltage detection circuit and the operational voltage range of the second overvoltage detection circuit, and the application range of the operational voltage range may be set in accordance with conditions such as the operational voltage.

Conditions for Setting Time Constant in Overvoltage Protection Circuit

The circuit of the power supply apparatus according to this embodiment is configured in such a way that the operation of the second overvoltage detection circuit turns on the FET 110 to melt the fuse which serves as the overcurrent shut-off unit, thereby shutting off power supply to the power supply apparatus. In this case, the time period that is determined by the circuit constant and selection of components needs to meet that "the time period from the start of the operation of the overvoltage protection circuit 200 till the melting of the fuse 102 is shorter than the time period in which a valve of the primary electrolytic capacitor 108 opens." The time period from the start of the operation of the overvoltage protection circuit 200 till the melting of the fuse 102 is substantially determined mainly by the Zener voltage of the Zener diode 201, the resistances of the resistors 202 and 203, the capacitance of the capacitor 204, and the melting time of the single fuse 102 alone. The constants of the individual elements needs to be determined in such a way that this time period becomes shorter than the time period in which the primary electrolytic capacitor 108 opens. In this case, if the gate turning on time of the FET 206 is set too short, even when an AC voltage in the rated voltage range is input to the power supply apparatus, the FET 206 may be turned on due to a noise-originating variation in voltage. It is therefore necessary to consider the setting of the gate turning on time of the FET 206. Particularly, in consideration that an external surge voltage may be applied for about 0.5 second due to an instantaneous variation in voltage, it is preferred to provide a time constant of about several seconds to cancel out the influence of the external surge voltage. It is preferred that the time constant be set mainly by the value of the capacitance of the capacitor 204, or by additionally providing a time constant circuit also in the shunt regulator 211 of the second overvoltage detection circuit.

Conditions for Selecting Fuse and Electrolytic Capacitor

The time period in which the single fuse 102 melts alone varies in accordance with the type of the fuse in use. For example, a fuse of 6.3 A type demonstrating a time-lag characteristic that is compatible with the EN60127-2 S.S.5 specifications melts in 0.15 to 5 seconds when a current (25.2 A) four times the normal value flows, and melts in 0.02 to 0.1 second when a current (63 A) ten times the normal value flows. Further, the fuse of the 6.3 A type demonstrating a fast-melting characteristic that is compatible with the EN60127-2 S.S.1 specifications melts in 0.003 to 0.3 second when the current (25.2 A) four times the normal value flows, and melts within 0.02 second when the current (63 A) ten times the normal value flows. Because the melting time varies depending on the fuse to be selected, the selection of the fuse is significantly related to the time period from the start of the operation of the overvoltage protection circuit 200 till the melting of the fuse 102. Therefore, the fuse 102 needs to be selected carefully.

At the time of detecting an overvoltage, the power supply voltage Vcc of the power supply IC 119 that keeps the FET 110 on depends on the voltage to be stored in the electrolytic capacitor 118. To melt the fuse 102, the FET 110 needs to be kept on, and when the FET 110 is on, a voltage is not induced on the auxiliary winding Nh. After the second overvoltage detection circuit operates, therefore, power is not supplied to the electrolytic capacitor 118 from the transformer 111. It is needless to say that, in order to melt the fuse 102 surely, the electrolytic capacitor 118 needs a sufficient capacity to keep the FET 110 on and supplement power consumption of the power supply IC 119 or the like for the time period in which the fuse 102 melts.

Because the time period and voltage for opening the valve vary even in primary electrolytic capacitors with the same rated voltage, a component needs to be carefully selected for the primary electrolytic capacitor 108. According to this embodiment, a component designed to cope with an abnormal voltage are used. In general, an electrolytic capacitor that is specified on a catalog provided by a manufacturer as being able to cope with an abnormal voltage has a thickness of an oxide coating film formed on the surface of a high-purity aluminum foil for an anode greater than the thickness of the oxide coating film of an electrolytic capacitor that is not designed to cope with an abnormal voltage. Accordingly, even an electrolytic capacitor with a rated voltage of 200 V demonstrates such a characteristic that the valve thereof opens on a higher voltage.

According to this embodiment, as described above, an overvoltage can be detected highly accurately with low power consumption. The use of the overvoltage protection circuit added to the related-art power supply circuit can overcome the problem such that the valve of the primary electrolytic capacitor opens to spout the electrolyte solution even when an overvoltage beyond the rated voltage range is applied. Further, circuit-based protection against an overvoltage is enabled without using a component with a high withstanding voltage or a component designed to cope with an overvoltage for the primary electrolytic capacitor, thus achieving downsizing and cost reduction of the power supply apparatus. Although a Zener diode is used as a constant voltage element in this embodiment, a constant voltage element such as a varistor may be used as long as the conditions for the operational voltage of the constant voltage element that vary in accordance with the environmental temperature and a production tolerance are satisfied. When the varistor is used, the varistor voltage is the voltage based on which an overvoltage is detected. Although a fuse is used as an element to shut off an overvoltage in this embodiment, the present invention is not limited to the fuse. For example, a current shut-off element such as a current breaker may be used to provide similar effects. Further, although a shunt regulator is used in the second overvoltage detection circuit as an element to detect an overvoltage, a comparator that compares the input voltage with a reference voltage and outputs a comparison result may be used, for example.

Second Embodiment

The description of the first embodiment is given of an overvoltage protection circuit configured to receive a DC voltage applied between the positive electrode, that is, the DCH (high-potential side) and the negative electrode, that is, the DCL (low-potential side) of the primary electrolytic capacitor located at the subsequent stage of the bridge diode, and to detect an overvoltage. In a description of a second embodiment of the present invention, a voltage from the AC power supply is input to the overvoltage protection circuit from the preceding stage of the bridge diode to detect an overvoltage.

Circuit Configuration of Power Supply Apparatus

Figure 5:
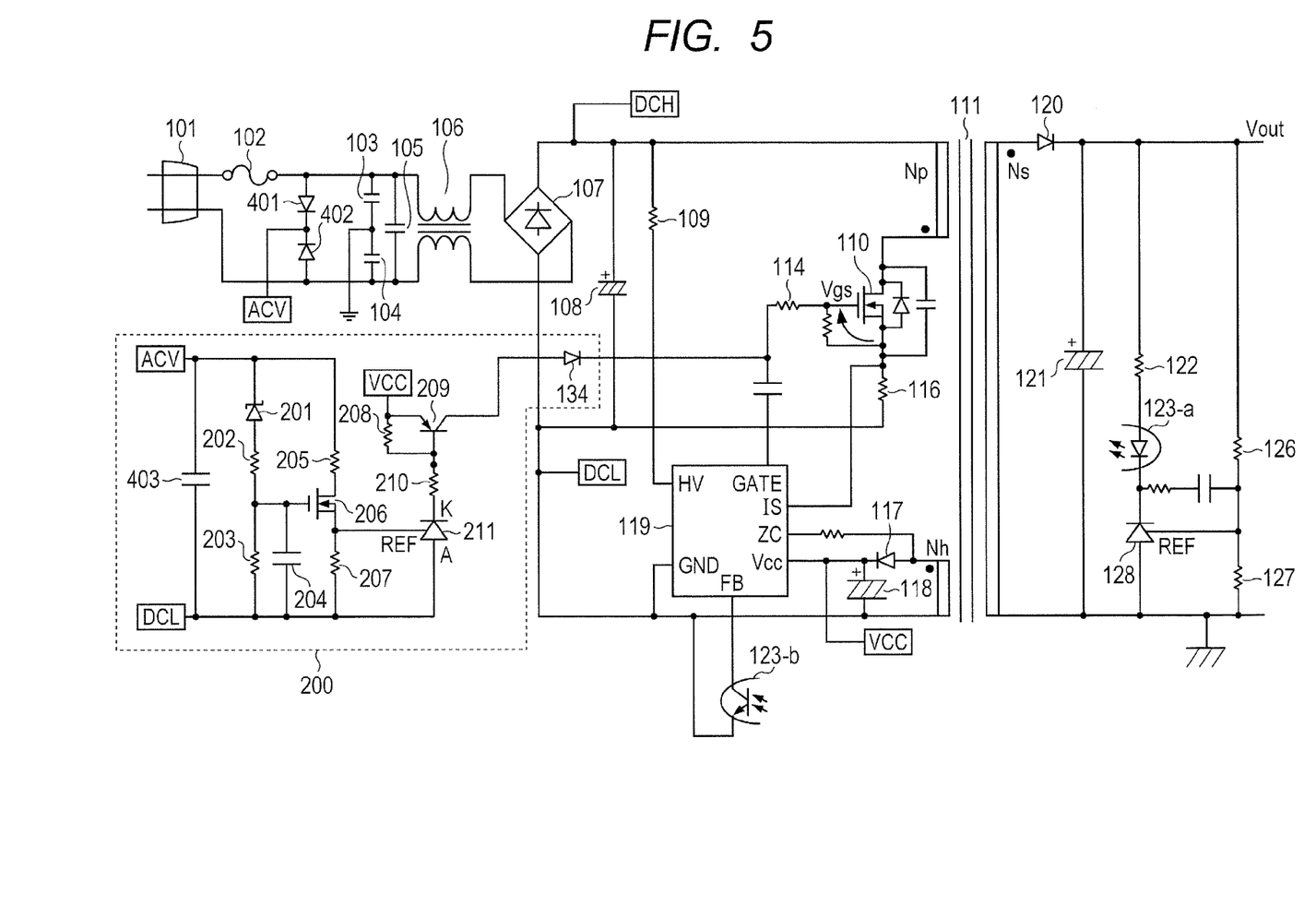
FIG. 5 is a diagram illustrating the circuit configuration of a power supply apparatus according to a second embodiment of the present invention.

FIG. 5 is a circuit diagram illustrating the circuit configuration of a power supply apparatus according to this embodiment. The circuit diagram in FIG. 5 differs from the circuit diagram of the first embodiment in FIG. 2 in that diodes 401 and 402 are added between the fuse 102 and the capacitors 103 and 104, and a capacitor 403 is added to the overvoltage protection circuit 200. In FIG. 5, a first line located on a side of the AC inlet 101 to which the fuse 102 is connected serves as a live side, and a second line located on a side of the AC inlet 101 to which the fuse 102 is not connected serves as a neutral side. The anode terminals of the diodes 401 and 402 are connected to the live-side line and the neutral-side line, respectively. The cathode terminal of the diode 401 and the cathode terminal of the diode 402 are connected together to be input to the overvoltage protection circuit 200 as ACV. In the overvoltage protection circuit 200, the capacitor 403 is provided between the input terminals ACV and DCL. The other circuits are the same as the circuits of the first embodiment illustrated in FIG. 2, and hence descriptions thereof are omitted.

Operation of Power Supply Apparatus

In FIG. 5, when the input voltage on the live-side line is higher than the input voltage on the neutral-side line, the input current from the AC inlet 101 flows as follows. That is, the input current flows through the neutral-side line from the live-side line, passing through the diode 401, the capacitor 403, the low-potential-side terminal (DCL) after rectification, and the bridge diode 107, to thereby charge the capacitor 403. When the input voltage on the neutral-side line is higher than the input voltage on the live-side line, on the other hand, the input current from the AC inlet 101 flows as follows. That is, the input current flows through the live-side line from the neutral-side line, passing through the diode 402, the capacitor 403, the low-potential-side terminal (DCL) after rectification, and the bridge diode 107, to thereby charge the capacitor 403. The overvoltage protection circuit 200 can acquire the input voltage from the preceding stage of the bridge diode 107 in this manner as in the case where the voltage rectified by the bridge diode 107 is input as described in the first embodiment.

According to this embodiment, as described above, an overvoltage can be detected highly accurately with low power consumption. According to this embodiment, the two diodes 401 and 402 are used to perform full-wave rectification to rectify the voltages on both of the live side and the neutral side. When considering only an overvoltage of the AC input voltage, however, it is sufficient to detect the voltage on one of the live-side line and the neutral-side line, and hence an overvoltage may be detected using only one of the outputs of the diodes 401 and 402.

Third Embodiment

The description of a third embodiment of the present invention is given of the configuration where the second overvoltage detection circuit is provided with a latch circuit so that, when an overvoltage is detected, the state is held, permitting the fuse to surely melt.

Circuit Configuration of Second Overvoltage Detection Circuit

Figure 6:
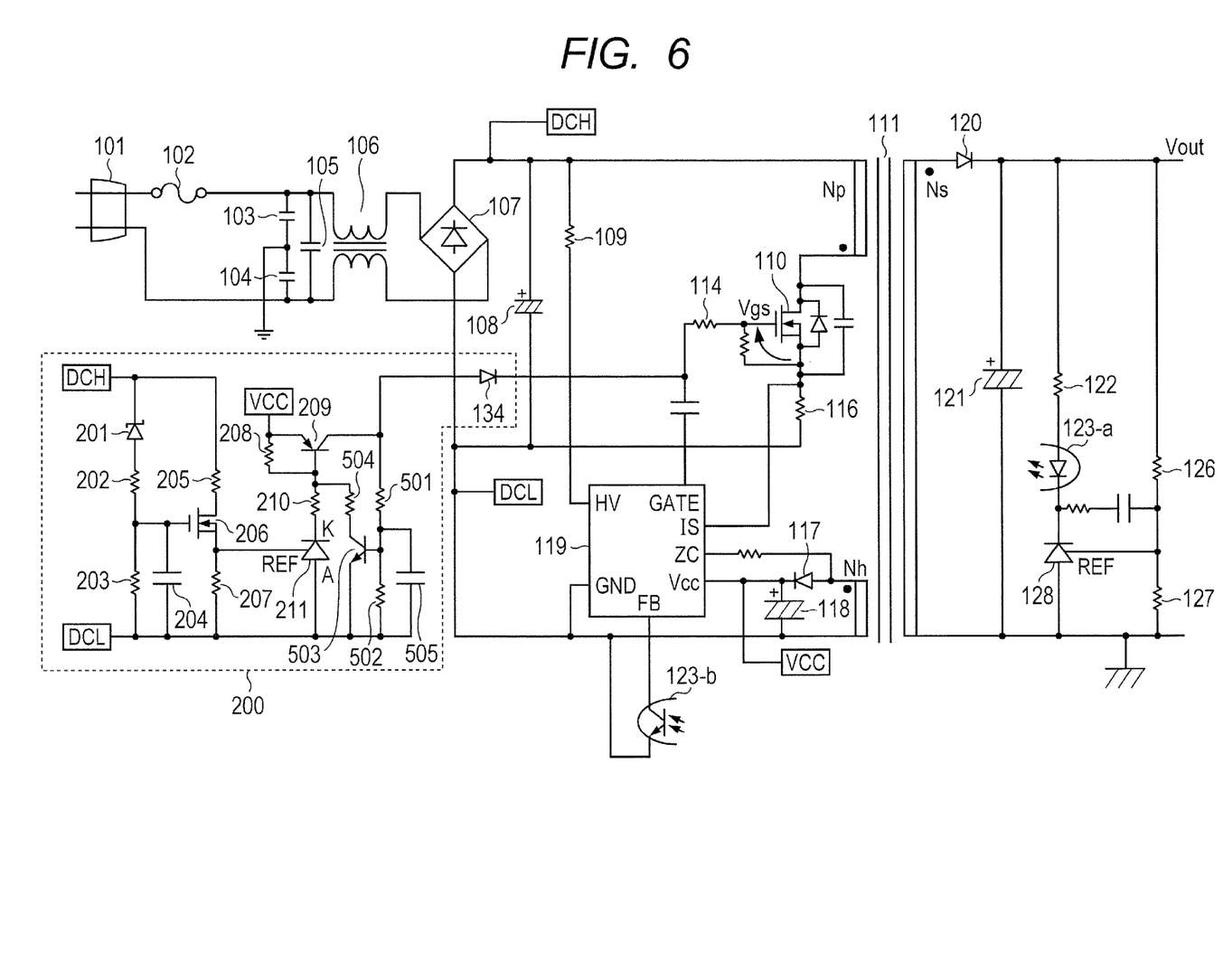
FIG. 6 is a diagram illustrating the circuit configuration of a power supply apparatus according to a third embodiment of the present invention.

FIG. 6 is a circuit diagram illustrating the circuit configuration of a power supply apparatus according to this embodiment. The circuit diagram in FIG. 6 differs from the circuit diagram of the first embodiment in FIG. 2 in that the latch circuit including a transistor 503, a capacitor 505, and resistors 501, 502, and 504 is added. In the latch circuit, the transistor 503 has a collector terminal connected to one terminal of the resistor 504, and an emitter terminal connected to the DCL (low-potential side). The other terminal of the resistor 504 is connected to the base terminal of the transistor 209. The resistors 501 and 502 are connected to the base terminal of the transistor 503, the other terminal of the resistor 501 is connected to the collector terminal of the transistor 209, and the other terminal of the resistor 502 is connected to the DCL (low-potential side). The capacitor 505 is connected in parallel to the resistor 502. The other circuits are the same as those illustrated in FIG. 2, and hence descriptions thereof are omitted.

Operation of Second Overvoltage Detection Circuit

The following describes the circuit operation when the input voltage to the overvoltage protection circuit 200 rises to such an extent that, after the first overvoltage detection circuit operates, the second overvoltage detection circuit operates. Through the operation of the first overvoltage detection circuit, the input voltage to the REF terminal of the shunt regulator 211 rises. When the input voltage becomes equal to or higher than the internal reference voltage of the shunt regulator 211, the shunt regulator 211 is turned on. Then, the current flows between the cathode terminal (K) and the anode terminal (A) of the shunt regulator 211, causing the voltage on the cathode terminal (K) side to drop. As a result, the current flows through the resistors 208 and 210. When the voltage produced across the resistor 208 exceeds the threshold value of the base-emitter voltage of the transistor 209, the transistor 209 is turned on. When the transistor 209 is turned on, the voltage is applied to the gate terminal of the FET 110 via the diode 134 and the resistor 114.

On the other hand, the collector terminal of the transistor 209 is connected to the base terminal of the transistor 503 via the resistor 501. When the transistor 209 is turned on and the voltage at the collector terminal rises, the base current flows through the base terminal of the transistor 503, turning on the transistor 503. When the transistor 503 is turned on, the current flows through the transistor 503 via the resistors 208 and 504, and hence the base current also flows through the base terminal of the transistor 209 to apply the voltage that keeps the transistor 209 on. As a result, the transistor 209 can be held on, regardless of whether the shunt regulator 211 is in an on state. Therefore, the transistor 209 can keep the FET 110 on even when the input voltage to the overvoltage protection circuit 200 becomes an overvoltage. Such a circuit configuration enables such an operation that, once the second overvoltage detection circuit operates, the fuse 102 melts surely. To provide the latch circuit with a time constant so that the latch circuit described above does not malfunction, the capacitor 505 is added in this embodiment. When noise originating from an external surge or the like is applied, the fuse 102 is prevented from erroneously melting due to the malfunction. Further, the configuration where the state holding unit such as the above-mentioned latch circuit is provided may be applied to the first and second embodiments described above as well as a fourth embodiment to be described later.

According to this embodiment, as described above, an overvoltage can be detected highly accurately with low power consumption.

Fourth Embodiment

The description of a fourth embodiment of the present invention is given of the overvoltage protection circuit in the power supply apparatus including two power supplies, specifically, what is called a standby power supply and a main power supply. For example, an image forming apparatus such as a laser beam printer includes a power supply apparatus including at least two power supplies, specifically, what is called a standby power supply that supplies power necessary when the image forming apparatus is in a standby state and a main power supply that supplies power necessary for a printing operation. In this case, in the standby mode where the image forming apparatus is not performing the printing operation, the standby power supply that is normally on supplies the necessary power, whereas at the time of executing a print command to perform the printing operation, the main power supply is operated, thereby achieving power saving when the image forming apparatus is in the standby mode. Accordingly, the description of this embodiment is given of the configuration of shutting off power supply to the main power supply, not melting the fuse serving as the first shut-off unit, when an overvoltage is detected.

Circuit Configuration of Power Supply Apparatus

Figure 7:
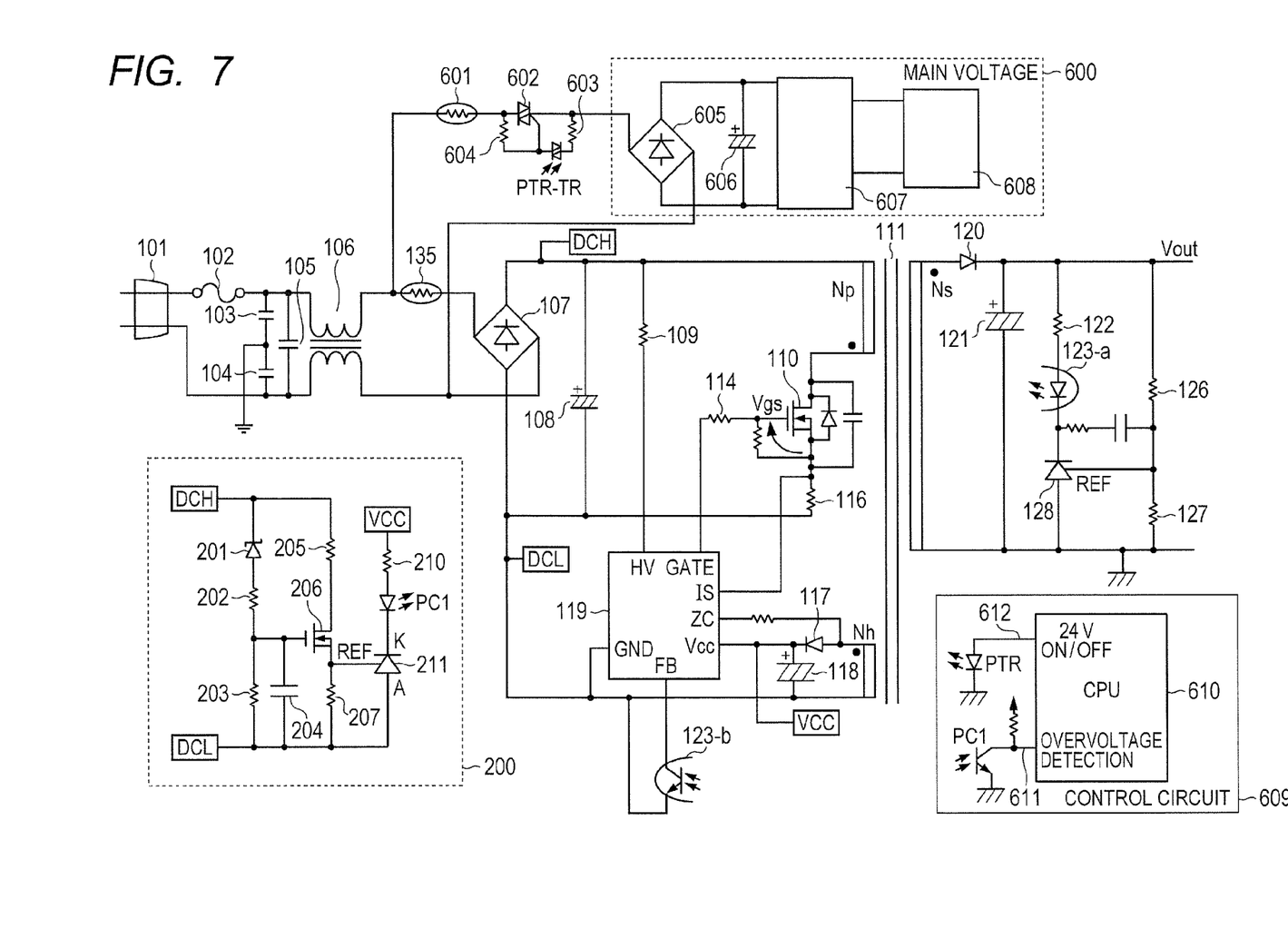
FIG. 7 is a diagram illustrating the circuit configuration of a power supply apparatus according to a fourth embodiment of the present invention.

FIG. 7 is a circuit diagram illustrating the circuit configuration of the power supply apparatus according to this embodiment. The circuit diagram in FIG. 7 differs from the circuit diagram of the first embodiment in FIG. 2 in that a main power supply 600 is added, a control circuit 609 for controlling power supply to the main power supply 600 is added, and the output of the overvoltage protection circuit 200 is sent to the control circuit 609. Note that, the control circuit 609 is provided inside the power supply apparatus in FIG. 7.

According to the first embodiment described above, when an overvoltage is detected, the overvoltage protection circuit 200 supplies the current to the gate terminal of the FET 110 via the diode 134 and the resistor 114 to turn the FET 110 on. According to the fourth embodiment, however, the transistor 209 and the resistor 208 are removed from the overvoltage protection circuit 200, and a photocoupler PC1 is provided between the resistor 210 and the shunt regulator 211. Unlike in the first embodiment where the voltage is applied to the gate terminal of the FET 110 to turn on the FET 110 when an overvoltage is detected, detection of an overvoltage is notified to a CPU 610 of the control circuit 609 via the photocoupler PC1.

An AC voltage is input from the AC power supply (not shown) to the main power supply 600 serving as a voltage generation unit for generating a voltage different from the voltage Vout via the AC inlet 101, a power thermistor 601, and a bidirectional thyristor 602 (hereinafter referred to as "triac 602"). The on/off state of the triac 602 which is a second shut-off unit is controlled to supply or shut off power to the main power supply 600 by a triac control unit PTR-TR of a photo triac coupler PTR connected to the triac 602 via resistors 603 and 604. The main power supply 600 includes a bridge diode 605 that full-wave rectifies an input AC voltage, a primary electrolytic capacitor 606 that smoothes the rectified voltage, and an insulated DC-DC converter 607 that generates a required DC voltage of, for example, DC 24 V, and supplies the DC voltage to a load 608.

The control circuit 609 includes a CPU 610 having a terminal 611 and a terminal 612, a phototransistor of a photocoupler PC1 connected to the terminal 611 and a pull-up resistor, and the photo triac coupler PTR connected to the terminal 612. A signal notifying detection of an overvoltage is input to the terminal 611 from the overvoltage protection circuit 200. A control signal for controlling the triac 602 that supplies power to the main power supply 600 is output from the terminal 612.

According to this embodiment, a power thermistor 135 is added between the common mode coil 106 and the bridge diode 107 in parallel to the power thermistor 601 connected to the triac 602 described above. Further, in this embodiment, the primary electrolytic capacitor 108 cannot be protected by melting the fuse. Accordingly, an electrolytic capacitor with a higher withstanding voltage than that of the electrolytic capacitor used in the first embodiment is used for the primary electrolytic capacitor 108 according to this embodiment. That is, an electrolytic capacitor, a film capacitor, a ceramic capacitor, or the like with a withstanding voltage high enough to prevent the valve of the capacitor from opening even when an overvoltage is applied, for example, with a withstanding voltage of DC 400 V to 450 V when the input voltage is AC 100 V, is used in this embodiment. The other circuits are the same as those of the first embodiment illustrated in FIG. 2, and hence descriptions thereof are omitted.

Operation of Power Supply Apparatus

Next, the operation of the power supply apparatus according to this embodiment is described. The following describes the operations of the circuits added in this embodiment, and descriptions of the operations of those circuits which are the same as those of the first embodiment are omitted. According to this embodiment, when the shunt regulator 211 serving as the second overvoltage detection circuit of the overvoltage protection circuit 200 detects an overvoltage and is turned on, the photocoupler PC1 is turned on, and hence the LED of the photocoupler PC1 becomes conductive to emit light. Then, the phototransistor of the photocoupler PC1 connected to the terminal 611 of the CPU 610 of the control circuit 609 is turned on, causing the current to flow via the pull-up resistor. As a result, a low-level signal which is an overvoltage detection signal is input to the terminal 611 of the CPU 610.

The CPU 610 of the control circuit 609 controls the photo triac coupler PTR connected to the terminal 612 to control the operation of the main power supply 600. In a case where the power supply apparatus according to this embodiment is mounted in the image forming apparatus and the image forming apparatus executes a print command to print, the CPU 610 controls the triac 602 in such a way that power is supplied to the main power supply 600 and a necessary voltage can be supplied to the load 608. That is, the CPU 610 outputs a high-level signal from the terminal 612 in FIG. 7. As a result, the LED of the photo triac coupler PTR connected to the terminal 612 becomes conductive to permit the current to flow, and is turned on. This causes the triac control unit PTR-TR of the photo triac coupler PTR to turn on. The on state of the triac control unit PTR-TR turns on the triac 602, and hence power is supplied to the main power supply 600 from the AC power supply (not shown) via the AC inlet 101, the fuse 102, the power thermistor 601, and the triac 602.

For example, in the standby mode where the image forming apparatus is not performing a printing operation, or when the overvoltage protection circuit 200 detects an overvoltage, on the other hand, the CPU 610 controls the triac 602 to shut off power supply to the main power supply 600. In other words, when a low-level signal is input to the terminal 611, the CPU 610 determines that the input voltage from the AC power supply (not shown) is an overvoltage, and outputs a low-level signal from the terminal 612. As a result, the current does not flow through the LED of the photo triac coupler PTR connected to the terminal 612, and hence the LED is turned off. This turns off the triac control unit PTR-TR of the photo triac coupler PTR, and turns off the triac 602, thereby shutting off power supply to the main power supply 600.

According to the circuit configuration of this embodiment, the time period of supplying power to the primary electrolytic capacitor 606 provided in the main power supply 600 is limited to the time period during which power is supplied to the main power supply 600. Therefore, the time period during which the current flows through the primary electrolytic capacitor 606 can be shortened significantly. As a result, the time period during which an overvoltage is applied as well as the voltage application time period in the normal operation mode of the power supply apparatus can be managed. Accordingly, from the viewpoints of the cost, size, and demanded service life, a more appropriate electrolytic capacitor can be selected as an electrolytic capacitor to be used as the primary electrolytic capacitor.

This embodiment takes such a configuration that does not shut off power supply by melting the fuse. Therefore, the overvoltage protection operation is possible with a configuration that is recoverable, for example, by switching the power switch on/off or plugging in or out the power plug (AC inlet). Further, a triac is used as a shut-off element in this example. However, it is needless to say that the configuration may be achieved by using a switching element such as a relay, an FET, or a transistor, as long as the configuration is recoverable by switching the power switch on/off or plugging in or out the power plug (AC inlet). In addition, although the control circuit 609 is provided inside the power supply apparatus according to this embodiment, the control circuit 609 may be provided in a control circuit or a controller included in the image forming apparatus.

According to this embodiment, as described above, an overvoltage can be detected highly accurately with low power consumption.

Fifth Embodiment

The power supply apparatus described in the first to fourth embodiments is applicable as, for example, a low voltage power supply of an image forming apparatus, that is, a power supply for supplying power to a controller (control unit) or a driving unit such as a motor. A description is now given of a configuration of the image forming apparatus to which the power supply apparatus according to the first to fourth embodiments is applied.

Configuration of Image Forming Apparatus

Figure 8:
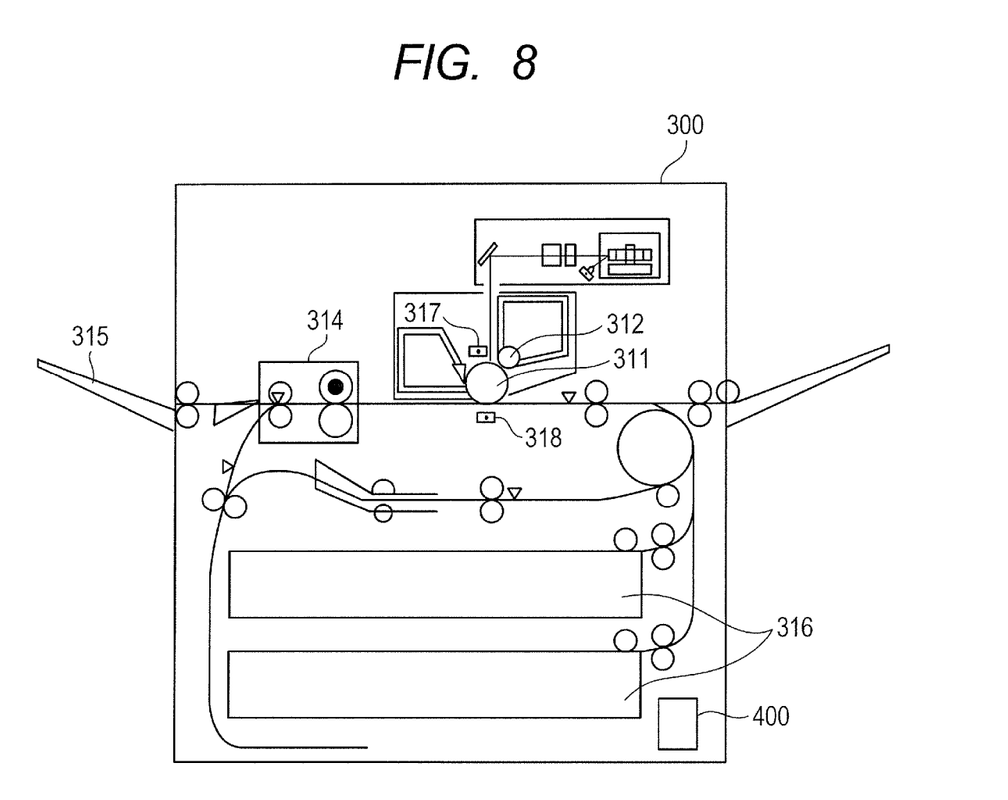
FIG. 8 is a schematic diagram illustrating an image forming apparatus according to a fifth embodiment of the present invention.

A laser beam printer is described as an example of the image forming apparatus. FIG. 8 illustrates a schematic configuration of the laser beam printer as an example of an electrophotographic printer. A laser beam printer 300 includes a photosensitive drum 311 as an image bearing member on which an electrostatic latent image is to be formed, a charging unit 317 (charging section) for uniformly charging the photosensitive drum 311, and a developing unit 312 (developing section) for developing the electrostatic latent image formed on the photosensitive drum 311 with toner. A toner image developed on the photosensitive drum 311 is transferred by a transfer unit 318 (transfer section) onto a sheet (not shown) as a recording material supplied from a cassette 316. The toner image transferred onto the sheet is fixed by a fixing unit 314 and is discharged to a tray 315. The photosensitive drum 311, the charging unit 317, the developing unit 312, and the transfer unit 318 correspond to an image forming unit. The laser beam printer 300 further includes a power supply apparatus 400 described in the first to fourth embodiments. Note that, the image forming apparatus to which the power supply apparatus according to the first to fourth embodiments is applicable is not limited to the one exemplified in FIG. 8. For example, the image forming apparatus may include multiple image forming units. Further, the image forming apparatus may include a primary transfer unit for transferring the toner image formed on the photosensitive drum 311 onto an intermediate transfer belt, and a secondary transfer unit for transferring the toner image formed on the intermediate transfer belt onto a sheet.

The laser beam printer 300 includes a controller (not shown) for controlling an image forming operation of the image forming unit and a sheet conveyance operation. The power supply apparatus according to the first to fourth embodiments supplies power to, for example, the controller. Further, the main power supply 600 of the power supply apparatus according to the fourth embodiment supplies power to a driving unit such as a motor for rotating the photosensitive drum 311 or driving various kinds of rollers for conveying a sheet. That is, the load 608 of the fourth embodiment corresponds to the driving unit. The image forming apparatus of this embodiment can reduce load and power consumption by supplying power only to, for example, the controller in the standby state for realizing power saving.

According to this embodiment, as described above, an overvoltage can be detected highly accurately with low power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-046745, filed Mar. 8, 2013, which is hereby incorporated by reference herein in its entirety.

What is claimed is:

1. A power supply apparatus, comprising:
   a transformer having a primary side and a secondary side insulated with each other;
   a first line and a second line to which an AC voltage is input from an AC power supply;
   a rectifying and smoothing unit that rectifies and smoothes the AC voltage input through the first line and the second line;

a shut-off unit provided between the first line and the rectifying and smoothing unit to shut off an input of the AC voltage;

a switching element that switches a current from the rectifying and smoothing unit to the primary side of the transformer;

a first overvoltage detection unit that when an input of an AC voltage higher than a first threshold value from the AC power supply is detected, outputs a voltage corresponding to the AC voltage;

a second overvoltage detection unit that receives the voltage output from the first overvoltage detection unit, wherein when it is detected that the voltage is higher than a second threshold value, the second overvoltage detection unit outputs an overvoltage detection signal; and a control unit that controls the shut-off unit to shut off the input of the AC voltage when the overvoltage detection signal is detected.

2. A power supply apparatus according to claim 1, wherein the rectifying and smoothing unit comprises a bridge diode and an electrolytic capacitor; and the AC voltage detected by the first overvoltage detection unit includes a voltage across the electrolytic capacitor.

3. A power supply apparatus according to claim 2, wherein a time period from inputting of the AC voltage higher than the first threshold value from the AC power supply till shut-off of the input of the AC voltage by the shut-off unit is shorter than a time period in which a valve of the electrolytic capacitor opens.

4. A power supply apparatus according to claim 1, wherein the first overvoltage detection unit operates and consumes power when the AC voltage input from the AC power supply is higher than the first threshold value.

5. A power supply apparatus according to claim 1, wherein the first overvoltage detection unit comprises a constant voltage element.

6. A power supply apparatus according to claim 5, wherein the constant voltage element includes one of a Zener diode and a varistor.

7. A power supply apparatus according to claim 6, wherein the first threshold value includes a Zener voltage of the Zener diode or a varistor voltage of the varistor.

8. A power supply apparatus according to claim 1, wherein the second overvoltage detection unit includes a shunt regulator.

9. A power supply apparatus according to claim 1, wherein the first threshold value includes a voltage lower than the second threshold value.

10. A power supply apparatus according to claim 1, wherein a variation range of a voltage detected by the second overvoltage detection unit is smaller than a variation range of a voltage detected by the first overvoltage detection unit.

11. A power supply apparatus according to claim 1, wherein the first overvoltage detection unit includes a time constant circuit.

12. A power supply apparatus according to claim 1, wherein the second overvoltage detection unit includes a latch circuit that latches an output of the overvoltage detection signal.

13. A power supply apparatus according to claim 12, wherein the latch circuit includes a time constant circuit.

14. A power supply apparatus according to claim 1, wherein the rectifying and smoothing unit comprises a bridge diode and an electrolytic capacitor; and the AC voltage detected by the first overvoltage detection unit comprises a voltage between a high-potential side of the AC voltage input through one of the first line and the second line and a low-potential side of the electrolytic capacitor.

15. A power supply apparatus according to claim 1, wherein the control unit controls the shut-off unit to shut off the input of the AC voltage by turning on the switching element to cause an overcurrent to flow.

16. A power supply apparatus according to claim 15, wherein the shut-off unit includes a fuse.

17. A power supply apparatus according to claim 1, further comprising a voltage generation unit that receives an AC voltage from the first line and the second line, and produces a voltage different from a voltage produced on the secondary side of the transformer, wherein the shut-off unit includes a first shut-off unit having one terminal connected to the first line, and a second shut-off unit having one terminal connected to the first shut-off unit and another terminal connected to the voltage generation unit, the second shut-off unit being configured to shut off the input of the AC voltage to the voltage generation unit; and the control unit controls, when detecting the overvoltage detection signal, the second shut-off unit to shut off the input of the AC voltage to the voltage generation unit.

18. A power supply apparatus according to claim 17, wherein the first shut-off unit includes a fuse, and the second shut-off unit comprises a bidirectional thyristor.

19. An image forming apparatus, comprising:

an image forming unit that forms an image on a sheet; and a power supply that supplies power to the image forming apparatus, the power supply comprising:

a transformer having a primary side and a secondary side insulated with each other;

a first line and a second line to which an AC voltage is input from an AC power supply;

a rectifying and smoothing unit that rectifies and smoothes the AC voltage input through the first line and the second line;

a shut-off unit provided between the first line and the rectifying and smoothing unit to shut off an input of the AC voltage;

a switching element that switches a current from the rectifying and smoothing unit to the primary side of the transformer;

a first overvoltage detection unit that when an input of an AC voltage higher than a first threshold value from the AC power supply is detected, outputs a voltage corresponding to the AC voltage;

a second overvoltage detection unit that receives the voltage output from the first overvoltage detection unit, wherein when it is detected that the voltage is higher than a second threshold value, the second overvoltage detection unit outputs an overvoltage detection signal; and a control unit that controls the shut-off unit to shut off the input of the AC voltage when the overvoltage detection signal is detected.

20. An image forming apparatus according to claim 19, further comprising a controller for controlling the image forming unit, wherein the power supply supplies power to the controller.

* * * * *